(12) United States Patent
Hermann

(10) Patent No.: US 8,298,692 B2
(45) Date of Patent: Oct. 30, 2012

(54) COLLECTION, STORAGE AND USE OF METAL-AIR BATTERY PACK EFFLUENT

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 176 days.

(21) Appl. No.: 13/013,852

(22) Filed: Jan. 26, 2011

(65) Prior Publication Data

US 2012/0040253 A1    Feb. 16, 2012

Related U.S. Application Data

(63) Continuation-in-part of application No. 12/887,557, filed on Sep. 22, 2010.

(60) Provisional application No. 61/372,351, filed on Aug. 10, 2010.

(51) Int. Cl.
*H01M 10/44* (2006.01)
*B60K 1/00* (2006.01)

(52) U.S. Cl. ............. 429/50; 429/64; 429/72; 429/120; 180/65.1; 180/65.21

(58) Field of Classification Search ................ None
See application file for complete search history.

(56) References Cited

U.S. PATENT DOCUMENTS

| | | | |
|---|---|---|---|
| 4,448,858 A * | 5/1984 | Graf et al. | 429/49 |
| 6,165,633 A * | 12/2000 | Negishi | 429/424 |
| 8,229,615 B2 * | 7/2012 | Sakamoto et al. | 701/22 |

* cited by examiner

*Primary Examiner* — Cynthia Lee
(74) *Attorney, Agent, or Firm* — Patent Law Office of David G. Beck

(57) ABSTRACT

A system and method for collecting, storing and using the oxygen-rich effluent generated when charging a metal-air battery pack is provided.

25 Claims, 5 Drawing Sheets

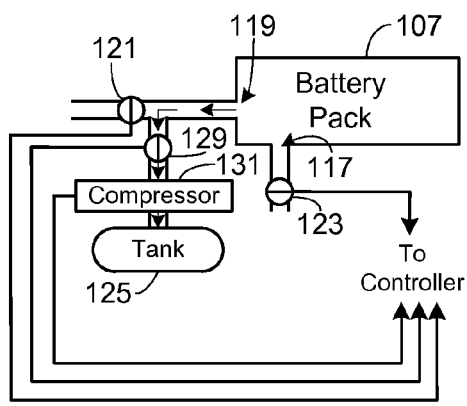
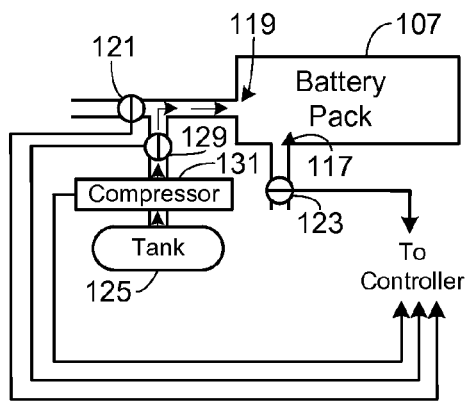
FIG. 11       FIG. 12
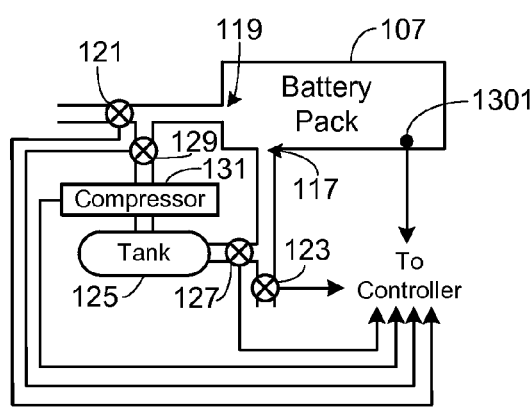
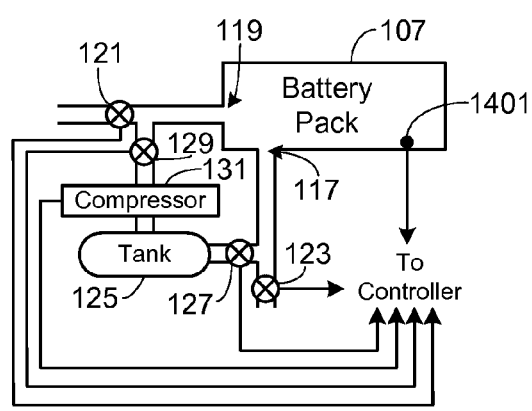
FIG. 13       FIG. 14

COLLECTION, STORAGE AND USE OF METAL-AIR BATTERY PACK EFFLUENT

CROSS-REFERENCE TO RELATED APPLICATION

This application is a continuation-in-part of U.S. patent application Ser. No. 12/887,557, filed Sep. 22, 2010, and claims benefit of the filing date of U.S. Provisional Patent Application Ser. No. 61/372,351, filed Aug. 10, 2010, the disclosures of which are incorporated herein by reference for any and all purposes.

FIELD OF THE INVENTION

The present invention relates generally to batteries and, more particularly, to means for increasing the efficiency of a metal-air battery pack through utilization of battery pack effluent.

BACKGROUND OF THE INVENTION

A metal-air cell is a type of battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

Regardless of the composition and mechanical nature of the elements used in a metal-air battery, oxygen is required for the reaction to take place. Therefore during the discharge cycle, the reaction rate of the cell may be varied by controlling the flow of oxygen into the cell. During the charging cycle, the metal oxides or ions are reduced to form the metal comprising the anode and oxygen is emitted by the cell.

While metal-air cells offer a number of advantages over a conventional rechargeable battery, most notably their extremely high energy density, such cells also have a number of drawbacks. For example, care must be taken to insure a sufficient supply of air to the cells during discharge cycles, and means for handling the oxygen emitted from the cells during the charge cycles, both of these issues becoming increasingly important as the number of metal-air cells and/or the size of the cells increase to meet the demands of larger applications.

Accordingly, while metal-air cells offer some intriguing benefits, such as their high energy densities, their shortcomings must be taken into account in order to successfully integrate the cells into a system.

SUMMARY OF THE INVENTION

The present invention provides a system and method for collecting, storing and using the oxygen-rich effluent generated when charging a metal-air battery pack.

In at least one embodiment of the invention, a battery pack optimization system is disclosed that includes a battery pack with at least one metal-air cell, a gas tank and a compressor. The battery pack includes an air inlet and an air outlet either of which may, in at least some embodiments, serve as either or both an inlet and an outlet. The gas tank includes a tank inlet and a tank outlet which, in some embodiments, may be the same inlet. The compressor is interposed between the battery pack air outlet and the tank inlet, the compressor configured to compress oxygen-rich effluent from the battery pack prior to filling the battery pack with the oxygen-rich effluent. The system may further comprise a system controller configured to open at least a first valve controlling oxygen-rich effluent flow from the battery pack to the compressor during the battery pack charge cycle, and configured to open at least a second valve controlling oxygen-rich effluent flow from the gas tank to the battery pack during the battery pack discharge cycle. The system controller may further be configured to initiate operation of the compressor during the charge cycle. The system controller may further be configured to close the first valve during the discharge cycle and close the second valve during the charge cycle. The system controller may further be configured to open a third valve controlling air flow from the ambient environment to the battery pack during the charge cycle and to open a fourth valve controlling air flow from the ambient environment to the battery pack during the discharge cycle. The system may utilize one-way valves to control air flow into and/or out of the battery pack. The system may further comprise at least one pressure monitor, wherein the system controller is configured to initiate operation of the compressor during the charge cycle when the system and/or battery pack pressure exceeds a preset pressure. The system may further comprise at least one oxygen monitor, wherein the system controller is configured to modulate the flow of oxygen-rich effluent from the gas tank to the battery pack in order to maintain battery pack oxygen levels to within a preset range. The system may further comprise a heat exchanger interposed between the battery pack and the compressor. The system may further comprise a battery pack charger circuit, wherein the compressor receives power from the battery pack charger circuit.

In at least one other embodiment of the invention, a method of operating a metal-air battery pack is provided, the method comprising the steps of coupling a battery pack outlet to a gas tank inlet, where a compressor is interposed between the battery pack outlet and the gas tank inlet; coupling a battery pack inlet to a gas tank outlet; compressing oxygen-rich effluent passing through the battery pack outlet with the compressor during the charge cycle; storing the oxygen-rich effluent compressed by the compressor in the gas tank; and transferring the oxygen-rich effluent from a gas tank outlet to a battery pack inlet during the discharge cycle. The method may further comprise the steps of initiating operation of the compressor during the charge cycle and terminating operation of the compressor during the discharge cycle. The method may further comprise the steps of closing the gas tank outlet and battery pack inlet during the charge cycle, and closing the gas tank inlet and battery pack outlet during the discharge cycle. The method may further comprise the steps of closing the gas tank outlet and opening an ambient air battery pack inlet during the discharge cycle. The method may further comprise the steps of closing the gas tank inlet and opening an ambient air battery pack outlet during the charge cycle. The method may further comprise the step of selecting a one-way valve for an ambient air battery pack inlet. The method may further comprise the steps of monitoring battery pack pressure, comparing the monitored pressure to a preset pressure level, and initiating operation of the compressor during the charge cycle when the pressure is above the preset pressure level and terminating operation of the compressor during the charge cycle when the pressure is below the preset pressure level. The method may further comprise the steps of monitoring pressure at the compressor inlet, comparing the monitored pressure to a preset pressure level, and initiating operation of the compressor during the charge cycle when the pressure is above the preset pressure level and terminating operation of the compressor during the charge cycle when the pressure is below the preset pressure level. The method may further comprise the steps of monitoring battery oxygen levels, comparing the monitored oxygen level to a preset oxygen range, and modulating flow of oxygen-rich effluent from the gas tank to the battery pack during the discharge cycle to maintain the oxygen level to within the preset oxygen range. The method may further comprise passing the oxygen-rich effluent through a heat exchanger located between the battery pack outlet and the compressor. The method may further comprise withdrawing heat from the oxygen-rich effluent with a heat exchanger during at least a portion of the charge cycle.

A further understanding of the nature and advantages of the present invention may be realized by reference to the remaining portions of the specification and the drawings.

BRIEF DESCRIPTION OF THE DRAWINGS

FIG. 11 illustrates an alternate embodiment, the figure showing the system operating in the charge cycle;

FIG. 12 illustrates the embodiment shown in FIG. 11 with the system operating in the discharge cycle;

FIG. 13 illustrates the embodiment shown in FIGS. 3-10 with the addition of a pressure sensor;

FIG. 14 illustrates the embodiment shown in FIGS. 3-10 with the addition of an oxygen sensor;

DESCRIPTION OF THE SPECIFIC EMBODIMENTS

Figure 1:
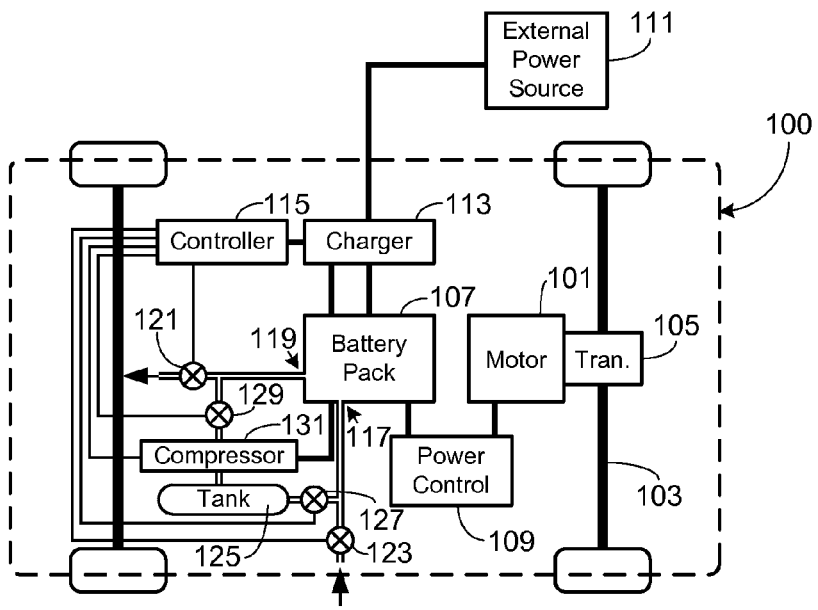
FIG. 1 illustrates the basic elements of a system for collecting, storing and re-using oxygen-rich effluent that is generated during the charge cycle of a metal-air battery pack, the system utilizing an internally mounted charger.

In the following text, the terms "battery", "cell", and "battery cell" may be used interchangeably. The term "battery pack" as used herein refers to one or more individual batteries that are electrically interconnected to achieve the desired voltage and capacity for a particular application, the individual batteries typically contained within a single piece or multi-piece housing. The term "electric vehicle" as used herein refers to an all-electric vehicle, also referred to as an EV, a plug-in hybrid vehicle, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Given the high energy density and the large capacity-to-weight ratio offered by metal-air cells, they are well suited for use in electric vehicles, either as a stand-alone electrical power source or in conjunction with one or more other power sources, for example, a lithium ion battery pack. Regardless of whether a vehicle uses a metal-air battery pack alone or in combination with another battery pack, the size of the metal-air battery pack in either configuration is likely to be quite large. As a result, during battery charging a large amount of oxygen is expected to be generated. For example, assuming a 100 kWh metal-air battery pack, during charging such a pack will release approximately 19 cubic meters of oxygen. As a consequence, in a relatively small confined region such as a single car garage, the charging of such a battery pack can easily double the oxygen concentration from the normal concentration of 20.95% to over 40%, both concentrations being expressed relative to other compounds within the air. Accordingly, charging a large metal-air battery pack in a confined area can increase the oxygen concentration dramatically, thereby decreasing the lower explosive limit or lower flammable limit (LEL/LFL) of vapors within the confined region (e.g., gasoline used in a lawn mower stored in the garage), decreasing the autoignition temperature (AIT) of combustible materials contained within the same confined region (e.g., garage construction materials as well as various items/materials possibly stored within the garage), and similarly decreasing the flash point of liquids stored within the same confined region (e.g., cleaning supplies stored within the garage). As such it will be appreciated that care must be taken during charging to avoid reaching unsafe oxygen concentrations.

The system disclosed herein may be used to insure that charging the metal-air battery pack does not cause the oxygen concentration in the surrounding environment to increase beyond a preset limit. Additionally, the disclosed system provides a way of utilizing the oxygen generated during charging to enhance operation of the metal-air battery pack during the discharge cycle, improving the metal-air battery pack's power capabilities by providing it with an oxygen-rich source of air during its discharge cycle.

Figure 2:
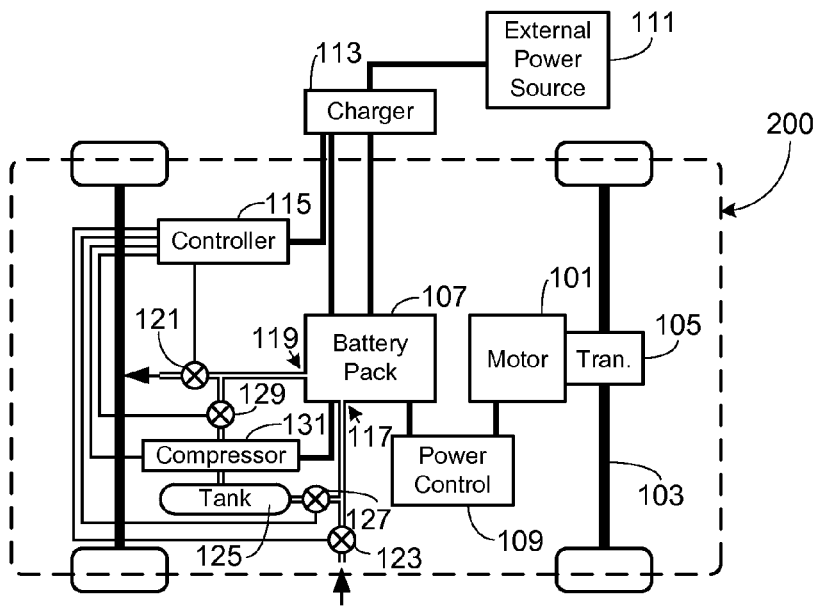
FIG. 2 illustrates an alternate configuration from that shown in FIG. 1, the alternate configuration utilizing an externally mounted charger.

FIGS. 1 and 2 illustrate the basic elements of an oxygen concentration, storage and utilization system in accordance with the invention. Although the system is shown implemented in an electric vehicle, i.e., electric vehicle 100 in FIG. 1 and electric vehicle 200 in FIG. 2, it should be understood that the disclosed system may be used with other systems utilizing a large metal-air battery pack, including non-vehicular systems (e.g., boats, residential or commercial battery systems, etc.). For illustration purposes, the drive systems shown in FIGS. 1 and 2 use a single electric motor 101 coupled to axle 103 via a transmission/differential assembly 105. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Battery pack 107 is comprised of metal-air cells and provides the electrical power required by motor 101 and, in some applications, required by various on-board auxiliary systems (e.g., HVAC, lights, entertainment subsystem, navigation subsystem, etc.). While the invention may be used with vehicles that utilize both a metal-air battery pack and at least one other battery pack, e.g., a lithium-ion battery pack, additional battery packs are not shown in the illustrations as they are not necessary for the operation and implementation of the present invention. Additionally, it should be understood that a vehicle may utilize multiple metal-air battery packs, for example to distribute the weight throughout the vehicle, and that the present invention is equally applicable to such configurations. Battery pack 107 is coupled to motor 101 via a power control module 109, module typically including a DC to AC converter. Power control module 109 insures that the power delivered to motor 101 has the desired voltage, current, waveform, etc. As such, power control module 109 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

During battery pack charging, battery pack 107 is coupled to an external power source 111 (e.g., wall socket, dedicated charging station, etc.) via a charging circuit 113. A controller 115, coupled to charger 113, controls operation of the charger, preferably controlling not only its status (on/off), but also its charge rate. Preferably controller 115 is built-in to charger 113, although it can be separate as shown. Note that charger 113 can be mounted within the vehicle as illustrated in FIG. 1, or external to the vehicle as shown relative to vehicle 200. In the embodiment illustrated in FIG. 2, controller 115 may be external to the vehicle, although it is preferably internal to the vehicle as shown, thus allowing the vehicle to be charged in a variety of situations with various chargers while still allowing the vehicle's system to determine optimal charge rate, etc.

Battery pack 107 includes an air inlet 117 and an air outlet 119. While the air inlet and air outlet are shown as being separate in this embodiment, it will be appreciated that other configurations may be employed without departing from the invention. For example, each battery pack vent may be used as either an air inlet or an air outlet, depending upon the position (i.e., opened or closed) of the various valves associated with the vents as well as the current operational cycle of the battery pack, i.e., charge cycle or discharge cycle.

In the illustrated embodiment, valve 121 controls the air flow from battery pack 107 to the outside environment and valve 123 controls the air flow into battery pack 107 from the outside environment. Coupled via piping to both battery pack inlet 117 and outlet 119 is high pressure gas tank 125, tank 125 being coupled to inlet 117 via valve 127 and to outlet 119 via valve 129. A compressor 131 is interposed between battery pack outlet 119 and tank 125, compressor 131 preferably receiving power from the external power source 111 via charger 113 as shown. Preferably operation of valves 121, 123, 127 and 129 as well as compressor 131 are automated using a controller. Note that while controller 115 is used in the illustrated embodiment to provide automated control, a different controller that is separate from charge controller 115 may be used to operate the oxygen storage and utilization system of the invention.

FIGS. 3-9 illustrate the primary modes of operation for the presently disclosed system. Variations of these modes may be used, however, to enhance the efficiency by which oxygen-rich battery pack effluent is collected and utilized. Note that in FIGS. 3-9 only the principal components of the oxygen collection, storage and use system are shown.

Figure 3:
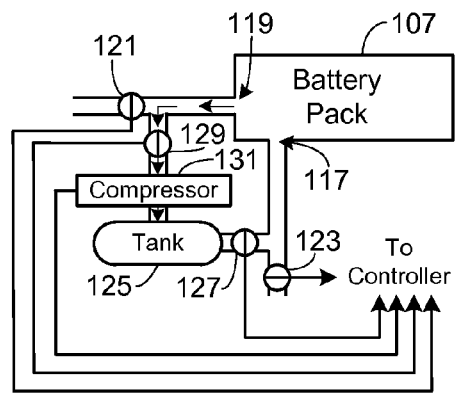
FIG. 3 illustrates a charge cycle with the oxygen-rich effluent being captured in accordance with the invention.
Figure 4:
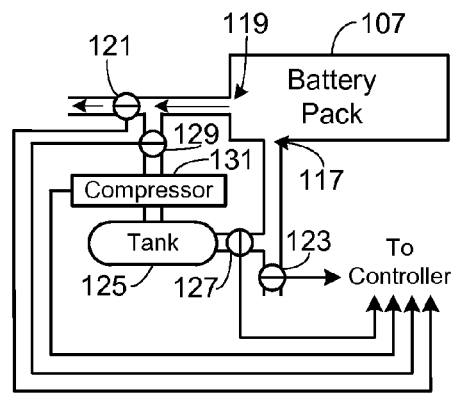
FIG. 4 illustrates a charge cycle with the oxygen-rich effluent not being captured.
Figure 5:
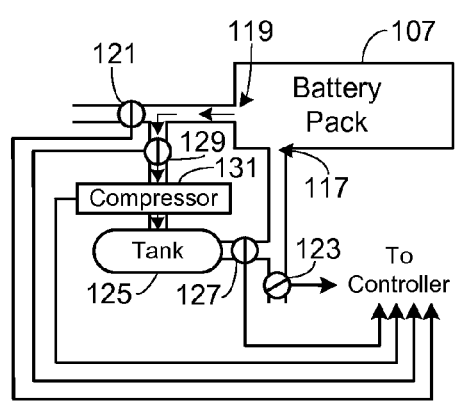
FIG. 5 illustrates the charge cycle shown in FIG. 3, with a battery pack inlet at least partially opened.

In FIG. 3, battery pack 107 is being charged by charger 113 (not shown in FIGS. 3-17). As such, oxygen-rich effluent is produced by the pack. By closing valves 121, 123 and 127 and opening valve 129, the oxygen-rich effluent is introduced to the inlet of compressor 131. Compressor 131 then compresses this oxygen-rich effluent and stores it within high pressure gas tank 125. For a 100 kWh battery pack and a 500 bar compressed gas tank, the entire volume of generated oxygen can be stored in a 38 liter tank. If a smaller tank is used than required to hold the entire effluent output from battery pack 107, or if for other reasons it is desirable to charge the battery pack without storing all or some of the effluent, valve 121 may be opened and valve 129 closed, thus allowing the effluent to exit the system to the ambient environment as illustrated in FIG. 4. Clearly in this mode of operation compressor operation is also terminated once the compressor inlet is disconnected from the output stream of battery pack 107. Note that if desired, the oxygen-rich effluent may be allowed to pass through the compressor to the tank as well as to the outside environment by opening, at least to some degree, both valves 121 and 129. While valves 123 and 127 are typically closed during the charge cycle, in some instances it is preferable to open valve 123 slightly, thus allowing a slight flow of ambient air through battery pack 107, thereby ensuring that compressor 131 receives a sufficient supply of air to its inlet (see, for example, FIG. 5, which is a modification of the mode shown in FIG. 3). As discussed further below, this same result can also be achieved by modulating compressor 131 based on the pressure at the compressor inlet.

Figure 6:
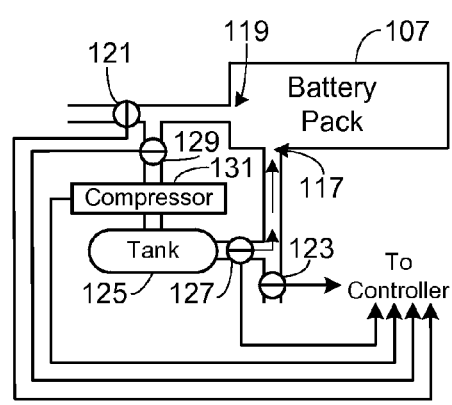
FIG. 6 illustrates a discharge cycle with the oxygen-rich effluent being used in accordance with the invention.
Figure 7:
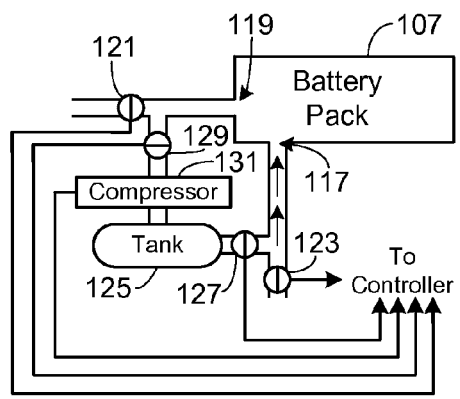
FIG. 7 illustrates a discharge cycle with the battery pack open to ambient.
Figure 8:
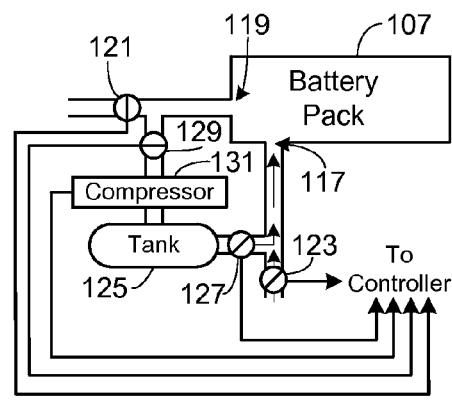
FIG. 8 illustrates a discharge cycle with the battery pack open to ambient and at least partially supplanted with the collected oxygen-rich effluent.
Figure 9:
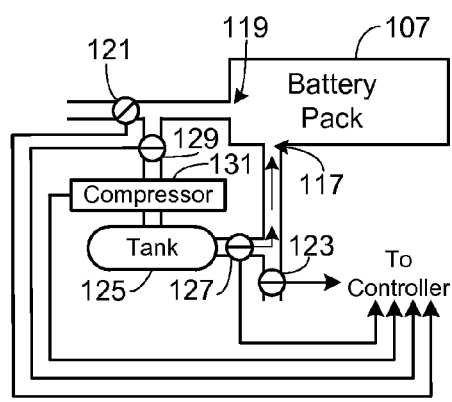
FIG. 9 illustrates the discharge cycle shown in FIG. 3, with a battery pack outlet at least partially opened.

In FIG. 6, battery pack charging is terminated and the battery pack is being discharged, for example in order to provide power to motor 101 (not shown in FIGS. 3-17). As such, compressor 131 operation is terminated and valves 121 and 129 are closed. In the mode of operation illustrated in FIG. 6, valve 127 is opened and valve 123 is closed, thus providing battery pack 107 with the previously stored oxygen-rich effluent. Alternately, valve 123 may be opened and valve 127 closed, as illustrated in FIG. 7, thus supplying battery pack with ambient air. Alternately, and as shown in FIG. 8, both valves 123 and 127 may be opened, to varying amounts, thus allowing the oxygen-rich effluent stored in tank 125 to supplant at least a portion of the ambient air stream. While valves 121 and 129 are typically closed during the discharge cycle, in some instances it is preferably to open valve 121 slightly, thus allowing a flow of air through battery pack 107, thereby preventing air stagnation and ensuring that the metal-air cells receive sufficient oxygen during this operational cycle (see, for example, FIG. 9, which is a modification of the mode shown in FIG. 6). As discussed further below, typically this goal is best achieved by monitoring battery pack pressure and/or oxygen concentration and varying inlet and outlet valves to insure adequate air flow and sufficient oxygen.

Figure 10:
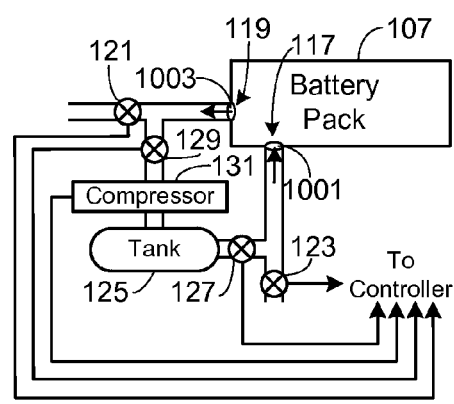
FIG. 10 illustrates an alternate embodiment utilizing one-way valves.

FIG. 10 illustrates a minor modification of the previously described system. As shown, battery pack inlet 117 includes a one-way valve 1001 and battery pack outlet 119 includes a one-way valve 1003. The use of one-way valves in one or both battery pack inlets/outlets may be used to simplify system operation. For example, during battery pack charging, valve 123 may be opened. This helps to ensure a flow of air into battery pack 107, as may be required, while not running the risk of oxygen-rich effluent escaping through this valve due to one-way valve 1001. Similarly, during battery pack discharge cycling, valve 121 may be opened, thus allowing an appropriate battery pack pressure to be maintained without running the risk of ambient air, rather than oxygen-rich effluent, being inadvertently fed into the battery pack. Note that the one-way valves may be separate or may be incorporated into other system valves, i.e., valves 123 and 1001 may be combined and/or valves 121 and 1003 may be combined.

As previously noted, other inlet/outlet and piping arrangements may be used without departing from the invention. For example, FIGS. 11 and 12 illustrate an alternate configuration in which the inlet and the outlet for the gas tank are one and the same. FIG. 11 corresponds to the prior arrangement and mode of operation shown in FIG. 3 in which battery pack 107 is being charged and the oxygen-rich effluent is being compressed and stored in tank 125. FIG. 12 corresponds to the prior arrangement and mode of operation shown in FIG. 6 in which battery pack 107 is operating in a discharge cycle and the oxygen-rich effluent previously stored in tank 125 is being fed back into the battery pack. Typically in this configuration during charging valve 121, valve 123, or both, may be opened if it becomes desirable or necessary to exhaust to ambient some, or all, of the effluent generated during charging. This scenario may arise, for example, if tank 125 is smaller than required to capture all of the effluent during a complete charge cycle. During the discharge cycle, typically valve 123 is used, as necessary, to allow air to be exhausted out of the battery pack. During this same cycle, valve 121 may be opened to either supplant, or replace, the oxygen-rich effluent from tank 125.

Storing the oxygen-rich effluent from metal-air battery pack 107 and then introducing the effluent, either by itself or to supplement ambient air, into the battery pack during the discharge cycle achieves several benefits. First, by collecting and storing the effluent emitted during battery pack charging, the oxygen concentration within the ambient environment (e.g., garage) can be held to a safe concentration level. If the effluent is not stored or otherwise controlled during charging, as previously noted the oxygen concentration in a closed environment (e.g., garage) may quickly reach dangerous concentrations, decreasing the LEL/LFL of vapors, the autoignition temperature of combustible materials, and the flash point of liquids stored within the closed environment. Second, as the electrical resistance of a metal-air cell during discharge is determined, in part, by the partial pressure of oxygen at the cathode, increasing the oxygen concentration by utilizing stored oxygen-rich effluent as described above leads to an increase in the partial pressure of oxygen, and thus a reduction in electrical resistance. By reducing electrical resistance, the power capability of the battery pack is increased. Third, a large metal-air battery pack, for example one sized for use with an EV, may experience reduced/depleted oxygen concentrations during the discharge cycle unless sufficient airflow is forced through the pack. Utilizing the oxygen-rich effluent stored in tank 125 reduces, if not altogether eliminates, this problem, leading to improved battery pack efficiency and power capabilities.

While the basic operation of the invention has been described, some variations will now be described that may be used to further enhance system performance. While these variations are shown relative to the system shown in FIGS. 3-10, it will be appreciated that they are equally applicable to other embodiments such as the configuration shown in FIGS. 11 and 12.

In the system illustrated in FIG. 13, one or more pressure monitors 1301 are added to the system, at least one of which is mounted within battery pack 107 as shown. The output of monitor(s) 1301 is coupled to the controller, e.g., controller 115. In this embodiment, the pressure within the battery pack is monitored and used to maintain an optimal pressure within the battery pack. Thus, for example, during the charge cycle, operation of compressor 131 may be modulated to maintain the pressure in the battery pack within a desired and preset pressure range. Similarly, by including a pressure monitor 1301 at the compressor inlet, the controller may be used to maintain the pressure at the compressor inlet within a preset pressure range, for example by modulating compressor operation. Similarly, other areas within the gas flow system may be monitored and used to achieve optimum system performance. It should be appreciated that the pressure monitor (s) 1301 may also be used during the discharge cycle to insure that the pressure within the battery pack is held within the desired pressure range, thus providing a means for setting the flow from tank 125 to the desired level.

In another embodiment of the system, oxygen concentration within the battery pack is monitored using at least one oxygen sensor 1401 as shown in FIG. 14. By monitoring the oxygen concentration within the battery pack, during the discharge cycle output from tank 125 to pack 107 can be controlled to insure efficient use of the oxygen-rich effluent. Specifically, during the discharge cycle oxygen is used by the air cathode of the metal-air cells at a given rate. Clearly if the effluent is forced through the battery pack at too high of a flow rate, the oxygen will not be efficiently used as a portion of the effluent will simply pass through the pack unused. Accordingly, monitoring oxygen concentration allows use of the effluent by the battery pack to be optimized. While a control loop as described above is preferred, it will be appreciated that a similar outcome may be reached by first determining the rate of oxygen use for a given set of parameters (e.g., battery pack size and age, temperature, etc.), and then controlling the output from tank 125 to battery pack 107 to meet the needs of the batteries.

Figure 15:
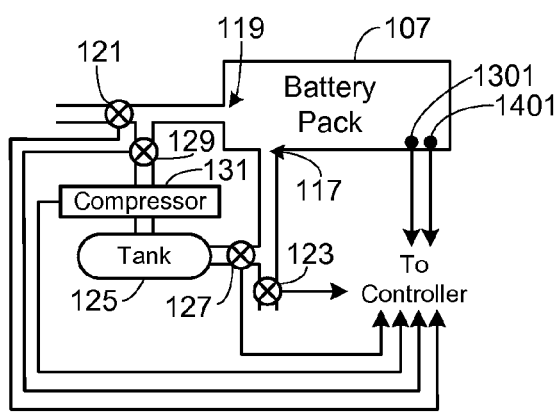
FIG. 15 illustrates the embodiment shown in FIGS. 3-10 with the addition of both a pressure sensor and an oxygen sensor.

The embodiment shown in FIG. 15 combines the pressure monitoring capabilities of the system shown in FIG. 13 with the oxygen monitoring capabilities of the system shown in FIG. 14, providing an improved ability to optimize system efficiency.

Figure 16:
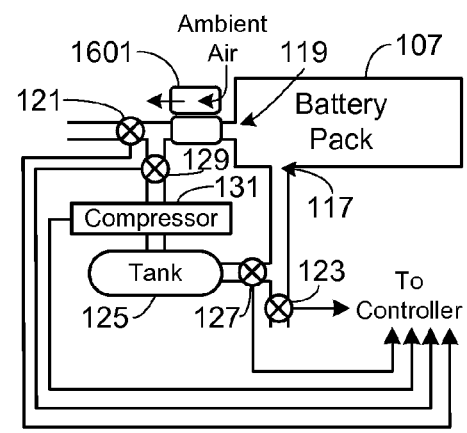
FIG. 16 illustrates the embodiment shown in FIGS. 3-10 with the addition of a heat exchanger.
Figure 17:
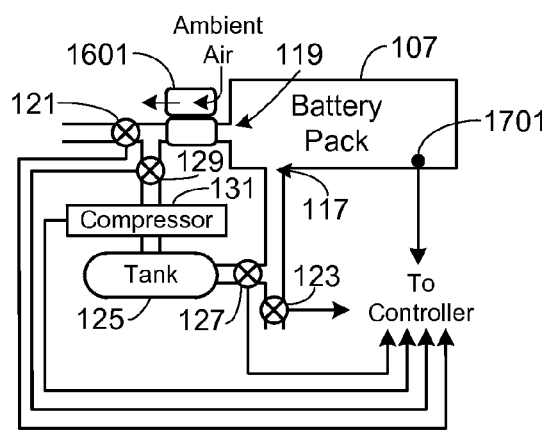
FIG. 17 illustrates the embodiment shown in FIG. 16 with the addition of a temperature sensor.

Since the charge efficiency of some metal-air cells can be low, battery pack 107 may become hot during the charge cycle. Accordingly, in at least one embodiment of the invention a heat exchanger 1601 is included between battery pack 107 and compressor 131 as shown in FIG. 16. Heat exchanger 1601 may be a simple air-air heat exchanger that cools the effluent from pack 107 prior to compression. In this embodiment, the heat exchanger utilizes ambient air for cooling, the ambient air preferably being forced through heat exchanger 1601 with a blower fan (not shown). Alternately, heat exchanger 1601 may be an air-liquid heat exchanger which is coupled to a liquid cooling system. In a minor variation of the system shown in FIG. 16, the system of FIG. 17 includes at least one temperature detector 1701 which monitors the temperature of the effluent. Preferably additional temperature detectors are used to monitor the temperature at multiple locations within battery pack 107 and/or the temperature of the effluent prior to entering compressor 131. By monitoring the temperature, the degree of cooling provided by heat exchanger 1601 may be varied, for example by controlling the speed of an associated blower fan, thus allowing further optimization. It will be understood that heat exchanger 1601 may be used with any of the previously described embodiments.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack optimization system, comprising:
a battery pack comprised of at least one metal-air cell and further comprised of a battery pack air outlet and a battery pack air inlet, wherein said battery pack is configured for use within an electric vehicle and to provide power to said electric vehicle;
a gas tank mounted within said electric vehicle, wherein said battery pack air outlet is coupled to a tank inlet of said gas tank, and wherein said battery pack air inlet is coupled to a tank outlet of said gas tank; and
a compressor interposed between said battery pack air outlet and said tank inlet, said compressor configured to compress oxygen-rich effluent from said battery pack air outlet prior to filling said gas tank with said oxygen-rich effluent.

2. The battery pack optimization system of claim 1, further comprising a system controller, said system controller configured to open at least a first valve controlling oxygen-rich effluent flow from said battery pack air outlet to said compressor and said tank inlet during a battery pack charge cycle, and configured to open at least a second valve controlling oxygen-rich effluent flow from said tank outlet to said battery pack air inlet during a battery pack discharge cycle.

3. The battery pack optimization system of claim 2, said system controller configured to initiate operation of said compressor during said battery pack charge cycle.

4. The battery pack optimization system of claim 2, said system controller configured to close said first valve controlling oxygen-rich effluent flow from said battery pack air outlet to said compressor and said tank inlet during said battery pack discharge cycle, and configured to close said second valve controlling oxygen-rich effluent flow from said tank outlet to said battery pack air inlet during said battery pack charge cycle.

5. The battery pack optimization system of claim 2, said system controller configured to open a third valve controlling air flow from an ambient environment to said battery pack air inlet during said battery pack charge cycle.

6. The battery pack optimization system of claim 5, wherein said third valve is coupled to a one way valve, said one way valve allowing air flow into said battery pack inlet.

7. The battery pack optimization system of claim 2, said system controller configured to open a third valve controlling air flow from said tank outlet to said ambient environment during said battery pack discharge cycle.

8. The battery pack optimization system of claim 7, wherein said third valve is coupled to a one way valve, said one way valve allowing air flow out of said battery pack outlet.

9. The battery pack optimization system of claim 2, further comprising at least one pressure monitor coupled to said system controller, said system controller configured to initiate operation of said compressor during said battery pack charge cycle when said pressure monitor indicates a pressure in excess of a preset pressure.

10. The battery pack optimization system of claim 2, further comprising at least one battery pack pressure monitor coupled to said system controller, said system controller configured to maintain battery pack pressure within a preset pressure range.

11. The battery pack optimization system of claim 2, further comprising at least one battery pack oxygen monitor coupled to said system controller, said system controller configured to modulate flow of oxygen-rich effluent from said tank outlet to said battery pack air inlet during said battery pack discharge cycle to maintain battery pack oxygen levels within a preset oxygen range.

12. The battery pack optimization system of claim 1, further comprising a heat exchanger interposed between said battery pack outlet and said compressor.

13. The battery pack optimization system of claim 1, further comprising a battery pack charger circuit, wherein said compressor receives power from said battery pack charger circuit.

14. A method of operating a metal-air battery pack mounted within an electric vehicle, the method comprising the steps of:
coupling a battery pack outlet to a tank inlet of a gas tank mounted within said electric vehicle, wherein a compressor is interposed between said battery pack outlet and said tank inlet;
coupling a battery pack inlet to a tank outlet of said gas tank;
compressing oxygen-rich effluent passing through said battery pack outlet with said compressor, wherein said oxygen-rich effluent is at least partially generated by said metal-air battery pack, and wherein said compressing step is performed during a battery pack charge cycle;
storing said oxygen-rich effluent compressed by said compressor during said battery pack charge cycle in said gas tank; and
transferring said oxygen-rich effluent through said tank outlet of said gas tank to said battery pack inlet of said metal-air battery pack during a battery pack discharge cycle.

15. The method of claim 14, further comprising the steps of initiating operation of said compressor during said battery pack charge cycle, and terminating operation of said compressor during said battery pack discharge cycle.

16. The method of claim 14, further comprising the steps of closing said tank outlet and said battery pack inlet during said battery pack charge cycle.

17. The method of claim 14, further comprising the steps of closing said tank inlet and said battery pack outlet during said battery pack discharge cycle.

18. The method of claim 14, further comprising the steps of closing said tank outlet during said battery pack discharge cycle, and opening an ambient air battery pack inlet during said battery pack discharge cycle.

19. The method of claim 14, further comprising the steps of closing said tank inlet during said battery pack charge cycle, and opening an ambient air battery pack outlet during said battery pack charge cycle.

20. The method of claim 19, further comprising the step selecting a one way inlet for said ambient air battery pack outlet, wherein said one way inlet allows ambient air to pass into said metal air battery pack during said battery pack charge cycle and does not allow said oxygen-rich effluent to pass out of said one way inlet.

21. The method of claim 14, further comprising the steps of monitoring pressure within said metal-air battery pack, comparing said pressure to a preset pressure level, and initiating operation of said compressor during said battery pack charge cycle when said pressure is above said preset pressure level and terminating operation of said compressor during said battery pack charge cycle when said pressure is below said preset pressure level.

22. The method of claim 14, further comprising the steps of monitoring pressure at a compressor inlet, comparing said pressure to a preset pressure level, and initiating operation of said compressor during said battery pack charge cycle when said pressure is above said preset pressure level and terminating operation of said compressor during said battery pack charge cycle when said pressure is below said preset pressure level.

23. The method of claim 14, further comprising the steps of monitoring oxygen levels within said metal-air battery pack, comparing said oxygen levels to a preset oxygen range, and modulating flow of said oxygen-rich effluent from said tank outlet to said battery pack inlet during said battery pack discharge cycle to maintain said oxygen level to within said preset oxygen range.

24. The method of claim 14, further comprising the steps of passing said oxygen-rich effluent through a heat exchanger, said heat exchanger located between said battery pack outlet and said compressor.

25. The method of claim 24, further comprising the steps of withdrawing heat from said oxygen-rich effluent utilizing said heat exchanger during at least a portion of said battery pack charge cycle.

\* \* \* \* \*